United States Patent
Fukuta et al.

(10) Patent No.: US 9,986,548 B2
(45) Date of Patent: May 29, 2018

(54) COMMUNICATION CONTROL METHOD, USER TERMINAL, AND BASE STATION

(71) Applicant: KYOCERA CORPORATION, Kyoto (JP)

(72) Inventors: Noriyoshi Fukuta, Inagi (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/168,659

(22) Filed: May 31, 2016

(65) Prior Publication Data

US 2016/0278059 A1    Sep. 22, 2016

Related U.S. Application Data

(63) Continuation of application No. PCT/JP2014/081835, filed on Dec. 2, 2014.

(30) Foreign Application Priority Data

Dec. 2, 2013    (JP) .................. 2013-249166

(51) Int. Cl.
*H04W 72/04* (2009.01)
*H04W 76/02* (2009.01)
(Continued)

(52) U.S. Cl.
CPC ......... *H04W 72/042* (2013.01); *H04W 8/005* (2013.01); *H04W 76/023* (2013.01);
(Continued)

(58) Field of Classification Search
CPC . H04W 72/0446; H04W 4/005; H04W 72/04; H04W 72/0406; H04W 72/0453; H04W 48/16
See application file for complete search history.

(56) References Cited

U.S. PATENT DOCUMENTS

2011/0258313 A1    10/2011  Nallik et al.
2014/0355483 A1*   12/2014  Jang ................. H04W 8/26
                                                    370/254
(Continued)

FOREIGN PATENT DOCUMENTS

JP    2013-526157 A    6/2013

OTHER PUBLICATIONS

International Search Report issued in PCT/JP2014/081835; dated Mar. 10, 2015.
(Continued)

*Primary Examiner* — Romani Ohri
(74) *Attorney, Agent, or Firm* — Studebaker & Brackett PC

(57) ABSTRACT

A communication control method according to an embodiment, comprises: transmitting, by a base station, information indicating a radio resource region by broadcast, wherein the radio resource region indicates a region of radio resources which a user terminal is able to use in order to receive a direct radio signal from a proximal user terminal; allocating, by the base station, a radio resource among the radio resource region to the user terminal; and dedicatedly transmitting, by the base station, control information to the user terminal. The control information includes information indicating the allocated radio resource. The allocated radio resource is a radio resource which the user terminal is able to use in order to transmit a direct radio signal to the proximal user terminal.

3 Claims, 10 Drawing Sheets

(51) Int. Cl.
*H04W 8/00* (2009.01)
*H04W 88/02* (2009.01)
*H04W 88/08* (2009.01)
*H04W 92/18* (2009.01)

(52) U.S. Cl.
CPC ............ *H04W 88/02* (2013.01); *H04W 88/08* (2013.01); *H04W 92/18* (2013.01)

(56) References Cited

U.S. PATENT DOCUMENTS

| | | | |
|---|---|---|---|
| 2015/0126210 A1* | 5/2015 | Peng | H04L 5/001 455/452.1 |
| 2015/0245192 A1* | 8/2015 | Wu | H04W 8/005 370/329 |
| 2015/0327046 A1* | 11/2015 | Lee | H04W 56/002 370/338 |
| 2016/0278069 A1* | 9/2016 | Lee | H04W 48/08 |

OTHER PUBLICATIONS

Written Opinion issued in PCT/JP2014/081835; dated Mar. 10, 2015.

3rd Generation Partnership Project; Technical Specification Group Services and System Aspects; Feasibility study for Proximity Services (ProSe); 3GPP TR 22.803 V12.1.0; Mar. 2013; pp. 1-45; Release 12; 3GPP Organizational Partners.

NTT DOCOMO, Inc.; Views on D2D discovery resource allocation; 3GPP TSG-RAN WG1 Meeting #75; R1-135522; Nov. 11-15, 2013; pp. 1-4; San Francisco, USA.

ZTE; Discussion on the data flow for D2D discovery; 3GPP TSG-RAN WG2 Meeting #83bis; R2-133203; Oct. 7-11, 2013; pp. 1-4; Ljubljana, Slovenia.

An Office Action; "Notice of Reasons for Rejection," issued by the Japanese Patent Office dated Jul. 26, 2016, which corresponds to Japanese Patent Application No. 2015-551513 and is related to U.S. Appl. No. 15/168,659; with English language statement of relevance.

Intel Corporation; "Type 2B resource allocation for D2D discovery" 3GPP TSG-RAN2 Meeting #84; R2-134287; Nov. 11-15, 2013; pp. 1-3; San Francisco, USA.

The extended European search report issued by the European Patent Office dated Jul. 12, 2017, which corresponds to European Patent Application No. 14867634.9-1857 and is related to U.S. Appl. No. 15/168,659.

ETRI; "Discussion on resource allocation for D2D discovery"; 3GPP TSG RAN WG1 Meeting #75; R1-135279; Nov. 11-15, 2013; pp. 1-5; San Francisco, USA.

InterDigital Communications; "Consideration on Resource Allocation for D2D Discovery"; 3GPP TSG-RAN WG2 #84; Tdoc R2-134401; Nov. 11-15, 2013; pp. 1-5; San Francisco, CA, USA.

ZTE; "Discussion on Resource Allocation for D2D Discovery"; 3GPP TSG-RAN WG1 #74bis; R1-134309; Oct. 7-11, 2013; pp. 1-10; Guangzhou, China.

* cited by examiner

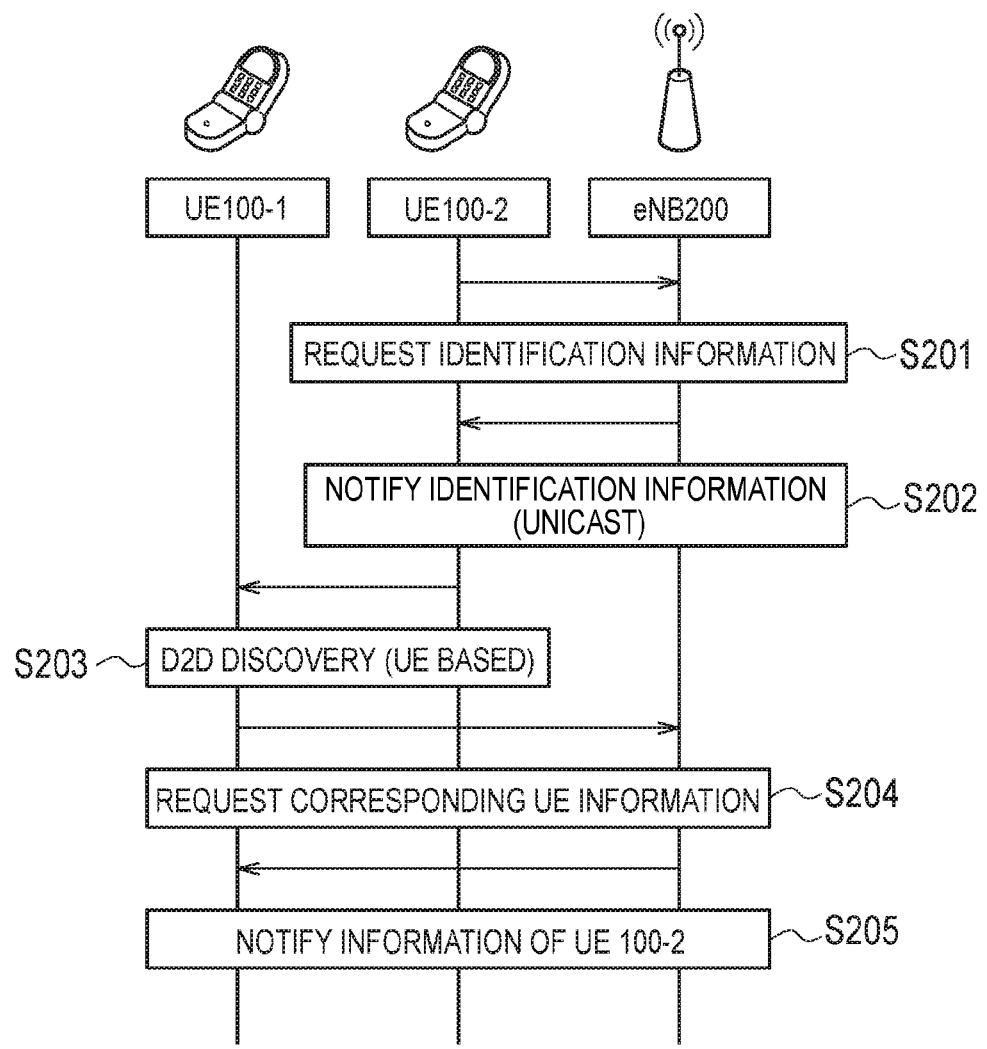

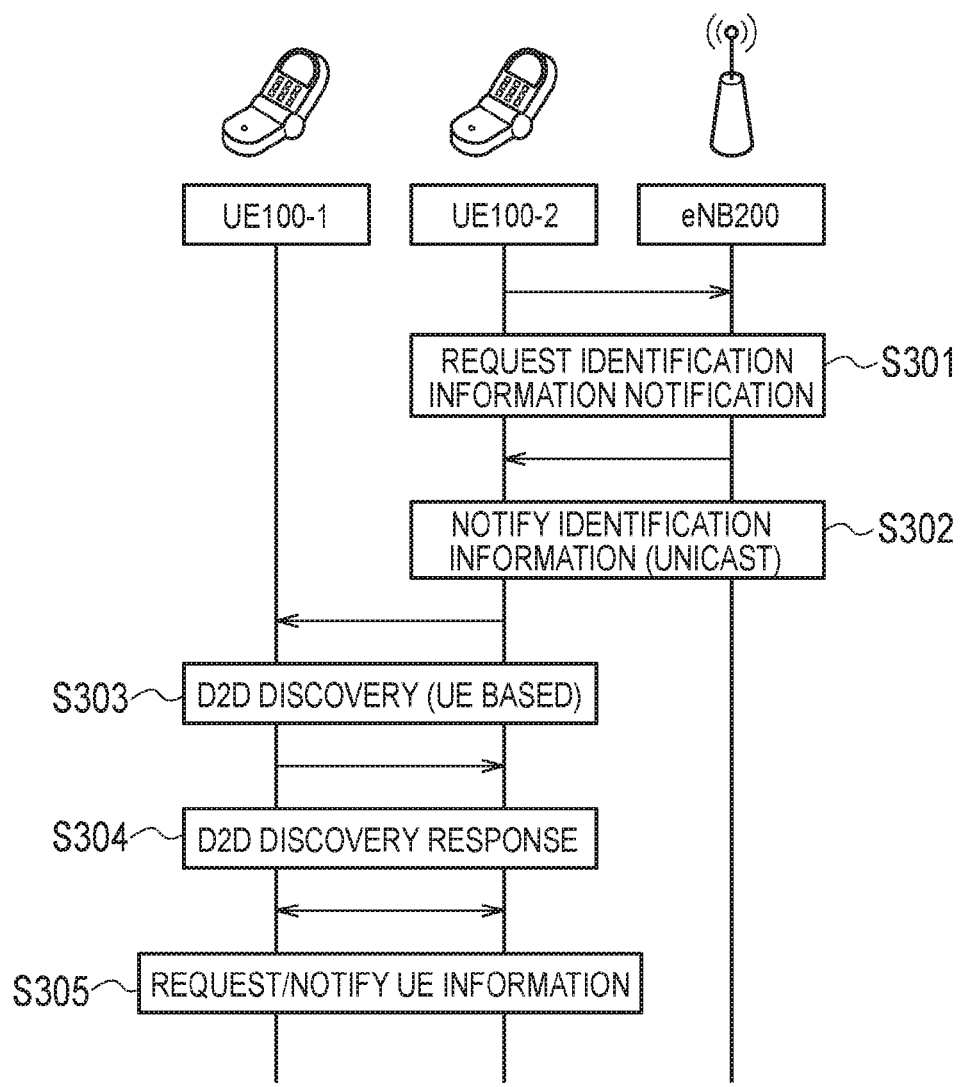

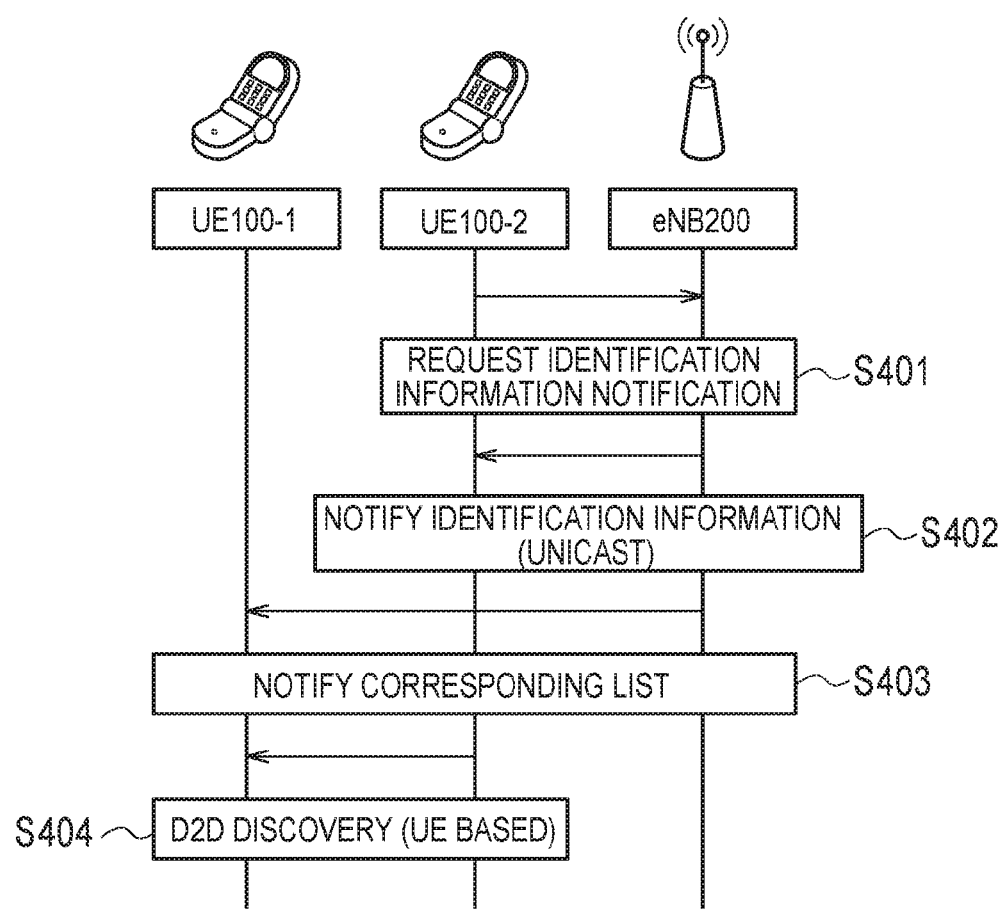

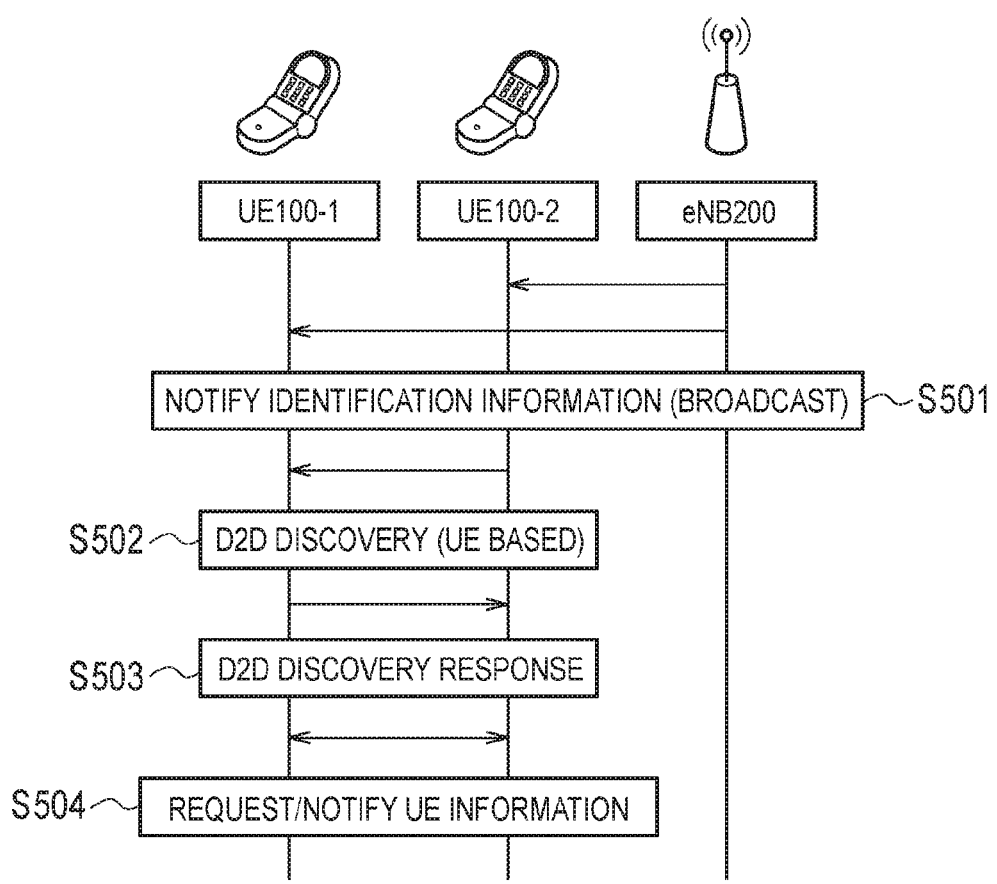

COMMUNICATION CONTROL METHOD, USER TERMINAL, AND BASE STATION

RELATED APPLICATIONS

This application is a continuation application of international application PCT/JP2014/081835, filed Dec. 2, 2014, which claims benefit of JP Patent Application 2013-249166, filed Dec. 2, 2013, the entirety of all applications hereby expressly incorporated by reference.

TECHNICAL FIELD

The present invention relates to a communication control method that supports D2D communication, a user terminal thereof, and a base station thereof.

BACKGROUND ART

In 3GPP (3rd Generation Partnership Project) which is a project aiming to standardize a mobile communication system, the introduction of Device to Device (D2D) communication is discussed as a new function after Release 12 (see non patent document 1).

In D2D communication, a plurality of adjacent user terminals performs direct device-to-device communication without passing through a core network. On the other hand, in cellular communication which is normal communication of a mobile communication system, a user terminal performs communication through a core network.

Here, the user terminal discovers another user terminal by a discovery signal (Discovery signal or Discoverable signal) used for discovering a partner terminal in the D2D communication.

As a process of discovering a partner terminal in D2D communication, there is a user terminal-based discovery process (hereinafter, referred to as "UE-type discovery process", where appropriate).

PRIOR ART DOCUMENT

Non-Patent Document

Non Patent Document 1: 3GPP technical report "TR 22.803 V12.1.0" March, 2013

SUMMARY

A communication control method according to an embodiment, comprises: transmitting, by a base station, information indicating a radio resource region by broadcast, wherein the radio resource region indicates a region of radio resources which a user terminal is able to use in order to receive a direct radio signal from a proximal user terminal; allocating, by the base station, a radio resource among the radio resource region to the user terminal; and dedicatedly transmitting, by the base station, control information to the user terminal. The control information includes information indicating the allocated radio resource. The allocated radio resource is a radio resource which the user terminal is able to use in order to transmit a direct radio signal to the proximal user terminal.

A base station according to an embodiment comprises: a transmitter configured to transmit information indicating a radio resource region by broadcast, wherein the radio resource region indicating a region of radio resources which a user terminal is able to use in order to receive a direct radio signal from a proximal user terminal; and a controller configured to allocate a radio resource among the radio resource region to the user terminal. The transmitter dedicatedly transmits control information to the user terminal. The control information includes information indicating the allocated radio resource. The allocated radio resource is a radio resource which the user terminal is able to use in order to transmit a direct radio signal to the proximal user terminal.

A user terminal according to an embodiment comprises: a receiver configured to receive information, transmitted by broadcast from a base station, indicating a radio resource region. The radio resource region indicates a region of radio resources which the user terminal is able to use in order to receive a direct radio signal from a proximal user terminal. The receiver further receives control information dedicatedly transmitted from the base station. The control information includes information indicating a radio resource allocated to the user terminal among the radio resource region by the base station. The allocated radio resource is a radio resource which the user terminal is able to use in order to transmit a direct radio signal to the proximal user terminal.

A processor for controlling a user terminal according to an embodiment, is configured to receive information, transmitted by broadcast from a base station, indicating a radio resource region, wherein the radio resource region indicates a region of radio resources which the user terminal is able to use in order to receive a direct radio signal from a proximal user terminal; and further configured to receive control information dedicatedly transmitted from the base station. The control information includes information indicating a radio resource allocated to the user terminal among the radio resource region by the base station. The allocated radio resource is a radio resource which the user terminal is able to use in order to transmit a direct radio signal to the proximal user terminal.

BRIEF DESCRIPTION OF THE DRAWINGS

FIG. 10 is a sequence diagram describing an operation sequence 2 of the mobile communication system according to the embodiment.
FIG. 11 is a sequence diagram describing an operation sequence 3 of the mobile communication system according to the embodiment.
FIG. 12 is a sequence diagram describing an operation sequence 4 of the mobile communication system according to the embodiment.

FIG. 13 is a sequence diagram describing an operation sequence 5 of the mobile communication system according to the embodiment.

DESCRIPTION OF THE EMBODIMENT

Overview of Embodiment

Figure 1:
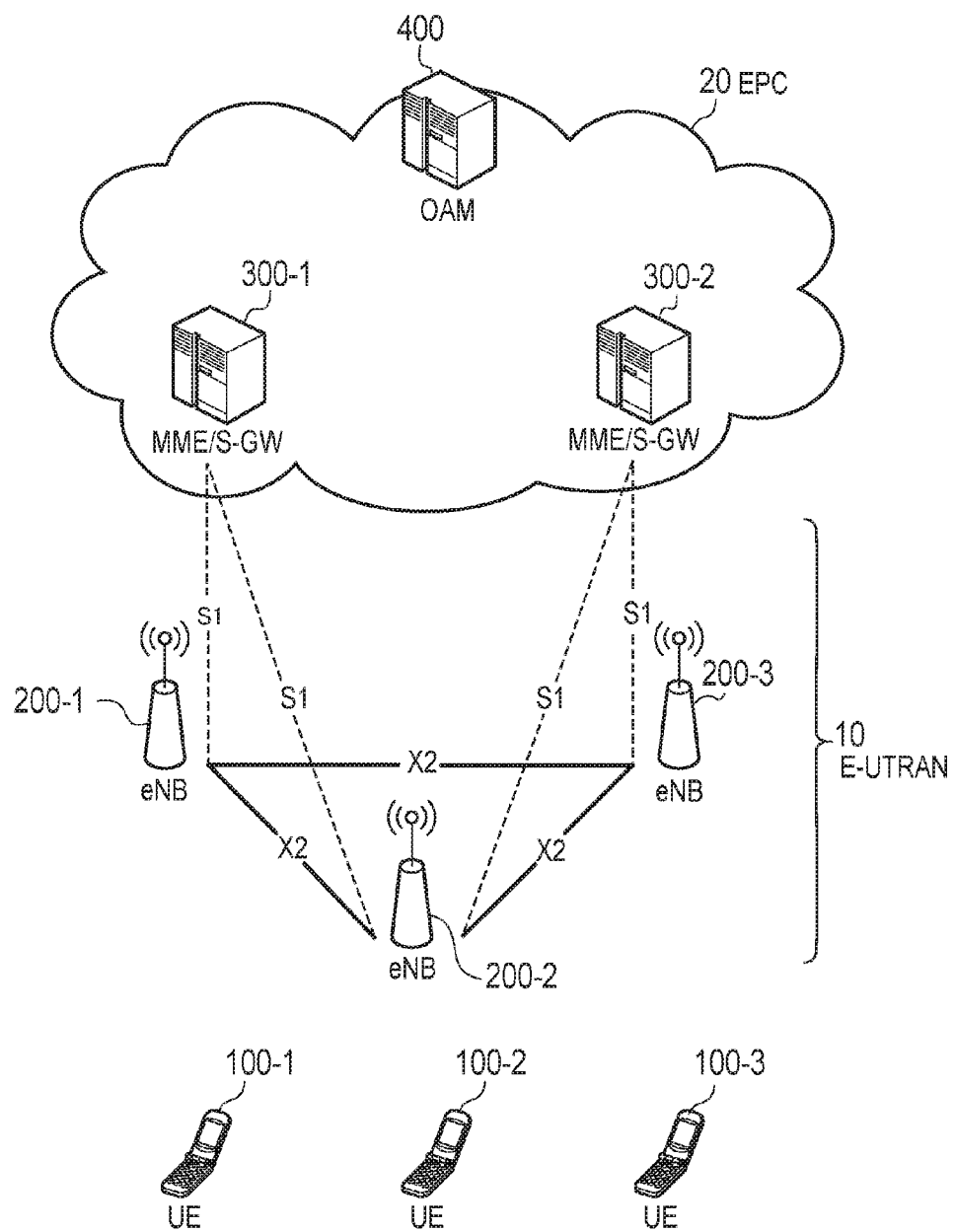
FIG. 1 is a configuration diagram of an LTE system.

As a process of discovering a partner terminal in D2D communication, in addition to the UE-type discovery process, introduction of a network-based discovery process (hereinafter, referred to as "NW-type discovery process", where appropriate) is assumed. In the current specifications, there is no framework to enable an effective function of the UE-type discovery process and the NW-type discovery process.

A communication control method according to an embodiment, comprises: transmitting, by a base station, information indicating a radio resource region by broadcast, wherein the radio resource region indicates a region of radio resources which a user terminal is able to use in order to receive a direct radio signal from a proximal user terminal; allocating, by the base station, a radio resource among the radio resource region to the user terminal; and dedicatedly transmitting, by the base station, control information to the user terminal. The control information includes information indicating the allocated radio resource. The allocated radio resource is a radio resource which the user terminal is able to use in order to transmit a direct radio signal to the proximal user terminal.

A base station according to an embodiment comprises: a transmitter configured to transmit information indicating a radio resource region by broadcast, wherein the radio resource region indicating a region of radio resources which a user terminal is able to use in order to receive a direct radio signal from a proximal user terminal; and a controller configured to allocate a radio resource among the radio resource region to the user terminal. The transmitter dedicatedly transmits control information to the user terminal. The control information includes information indicating the allocated radio resource. The allocated radio resource is a radio resource which the user terminal is able to use in order to transmit a direct radio signal to the proximal user terminal.

A user terminal according to an embodiment comprises: a receiver configured to receive information, transmitted by broadcast from a base station, indicating a radio resource region. The radio resource region indicates a region of radio resources which the user terminal is able to use in order to receive a direct radio signal from a proximal user terminal. The receiver further receives control information dedicatedly transmitted from the base station. The control information includes information indicating a radio resource allocated to the user terminal among the radio resource region by the base station. The allocated radio resource is a radio resource which the user terminal is able to use in order to transmit a direct radio signal to the proximal user terminal.

A processor for controlling a user terminal according to an embodiment, is configured to receive information, transmitted by broadcast from a base station, indicating a radio resource region, wherein the radio resource region indicates a region of radio resources which the user terminal is able to use in order to receive a direct radio signal from a proximal user terminal; and further configured to receive control information dedicatedly transmitted from the base station. The control information includes information indicating a radio resource allocated to the user terminal among the radio resource region by the base station. The allocated radio resource is a radio resource which the user terminal is able to use in order to transmit a direct radio signal to the proximal user terminal.

A communication control method according to an embodiment is used in a mobile communication system that supports a discovery process of discovering a proximal user terminal, where the discovery process includes a user terminal-based discovery process and a network-based discovery process. The communication control method comprises: a step of transmitting, by broadcast, by a base station, information indicating a radio resource region where it is possible to perform the user terminal-based discovery process; a step of allocating, by the base station, a time-frequency resource used for the network-based discovery process, to a user terminal; a step of transmitting, by unicast, by the base station, control information including the information indicating the time-frequency resource allocated to the user terminal, to the user terminal; a step of performing, by the user terminal, the user terminal-based discovery process by using the time-frequency resource within the radio resource region; and a step of performing, by the user terminal, the network-based discovery process by using the time-frequency resource allocated to the user terminal when the user terminal receives the control information.

In the embodiment, when the user terminal does not receive the control information, in order to transmit a discovery signal, the user terminal requests the control information to the base station.

In the embodiment, in the step of allocating the time-frequency resource, the base station allocates, to the user terminal, the time-frequency resource used for the network-based discovery process from the radio resource region.

In the embodiment, in the step of transmitting the control information, the base station transmits the control information including information allocated to the user terminal, and in the step of performing the network-based discovery process, the user terminal performs, on a basis of the control information, the discovery process by transmitting a discovery signal used for discovering a partner user terminal that is to be a partner in D2D communication of the user terminal.

In the embodiment, the control information includes transmission information for specifying a user terminal which transmits the discovery signal, and in the step of performing the network-based discovery process, the user terminal transmits the discovery signal on a basis of the transmission information.

In the embodiment, the step of performing the user terminal-based discovery process includes: a step of transmitting, by the base station, identification information for identifying a transmission source of a discovery signal used for discovering a partner user terminal that is to be a partner in D2D communication, to the user terminal; a step of transmitting, by the user terminal, on a basis of the identification information received from the base station, the discovery signal by using the time-frequency resource within the radio resource region; and a step of identifying, by the partner user terminal, the user terminal, on a basis of the identification information obtained by the received discovery signal.

A user terminal according to the embodiment is used in a mobile communication system that supports a discovery process of discovering a proximal user terminal, where the discovery process includes a user terminal-based discovery process and a network-based discovery process. The user terminal comprises: a receiver configured to receive, from a base station, information indicating a radio resource region where it is possible to perform the user-terminal-based discovery process, by broadcast; and a controller configured to perform the user terminal-based discovery process by using a time-frequency resource within the radio resource region. The controller performs the network-based discovery process by using the time-frequency resource allocated to the user terminal when control information including information indicating the time-frequency resource allocated to the user terminal is received from the base station by unicast.

A base station according to the embodiment is used in a mobile communication system that supports a discovery process of discovering a proximal user terminal, where the discovery process includes a user terminal-based discovery process and a network-based discovery process. The base station comprises: a controller configured to execute control to: transmit, by broadcast, information indicating a radio resource region where it is possible to perform the user terminal-based discovery process; allocate a time-frequency resource used for the network-based discovery process, to a user terminal; and transmit, by unicast, control information including the information indicating the time-frequency resource allocated to the user terminal, to the user terminal.

A user terminal according to the embodiment is used in a mobile communication system. The user terminal comprises: a receiver configured to receive, from a base station, information indicating a radio resource region capable of being used for transmission of a discovery signal for discovering a proximal user terminal, by broadcast; and a controller configured to control transmission of the discovery signal by using a time-frequency resource within the radio resource region. The controller controls, during RRC connection with the base station, to transmit the discovery signal by using the time-frequency resource allocated to the user terminal when information indicating the time-frequency resource allocated to the user terminal is received from the base station by unicast.

In the embodiment, in order to transmit a discovery signal, the user terminal requests, to the base station, the information indicating the time-frequency resource allocated to the user terminal.

A base station according to the embodiment is used in a mobile communication system. The base station comprises a controller configured to execute to control to: transmit, by broadcast, information indicating a radio resource region capable of being used for transmission of a discovery signal for discovering a proximal user terminal; allocate a time-frequency resource used for transmission of the discovery signal, to a user terminal; and during RRC connection with the user terminal, transmit, by unicast, information indicating the time-frequency resource allocated to the user terminal, to the user terminal.

A user terminal according to the embodiment is used in a mobile communication system that supports a discovery process of discovering a proximal user terminal. The user terminal comprises: a receiver configured to receive, by broadcast, from a base station, information indicating a radio resource region; and a controller configured to perform the discovery process by autonomously using a time-frequency resource within the radio resource region.

Embodiment (LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication apparatus and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400. Further, the EPC 20 corresponds to a core network.

The MME is a network node for performing various mobility controls, etc., for the UE 100 and corresponds to a controller. The S-GW is a network node that performs transfer control of user data and corresponds to a mobile switching center.

The OAM 400 is a server device managed by an operator and performs maintenance and monitoring of the E-UTRAN 10.

Next, the configurations of the UE 100 and the eNB 200 will be described.

Figure 2:
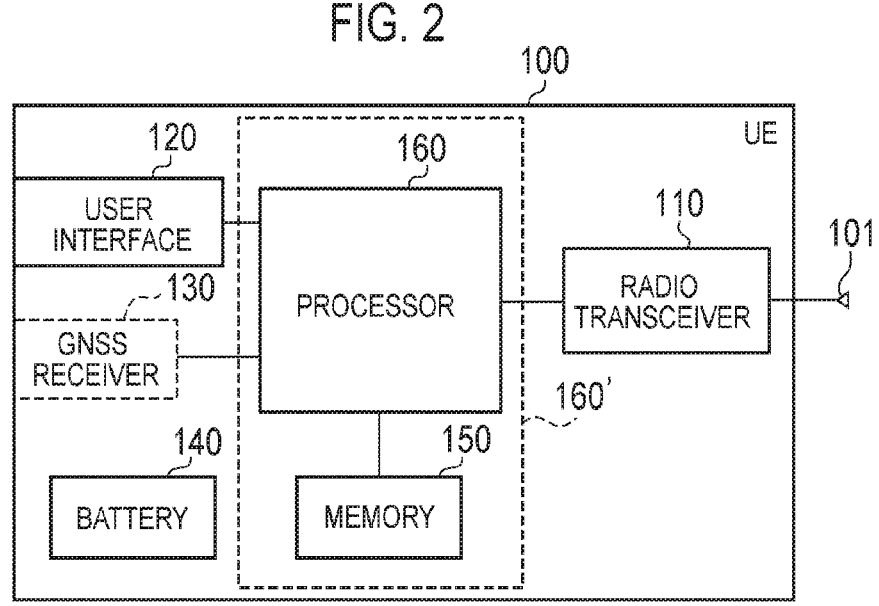
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The UE 100 may not have the GNSS receiver 130. It is noted that the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
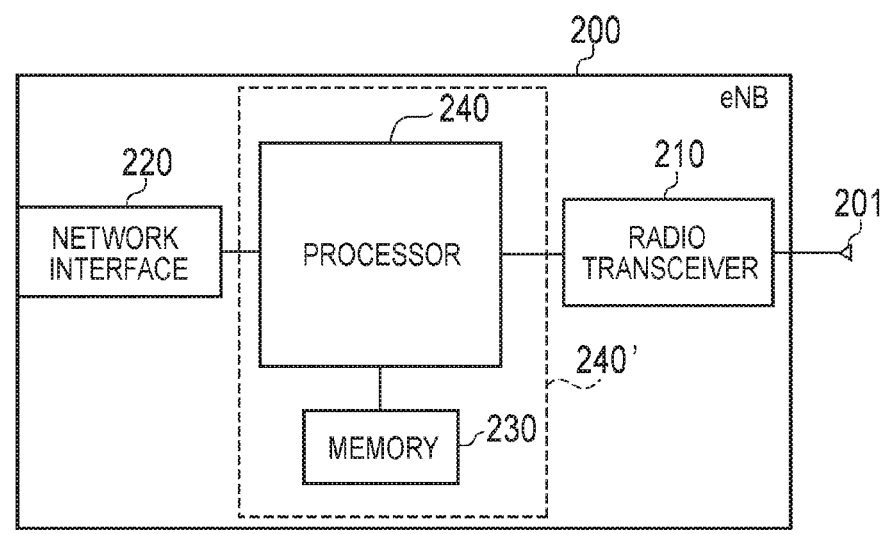
FIG. 3 is a block diagram of an eNB.

FIG. 3 is a block diagram of the eNB 200. As illustrated in FIG. 3, the eNB 200 (including a MeNB 200A, a PeNB 200B, and a PeNB 200B as described later) includes an antenna 201, a radio transceiver 210, a network interface 220, a memory 230, and a processor 240. The memory 230 and the processor 240 constitute a controller. It is noted that the memory 230 may be integrally formed with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
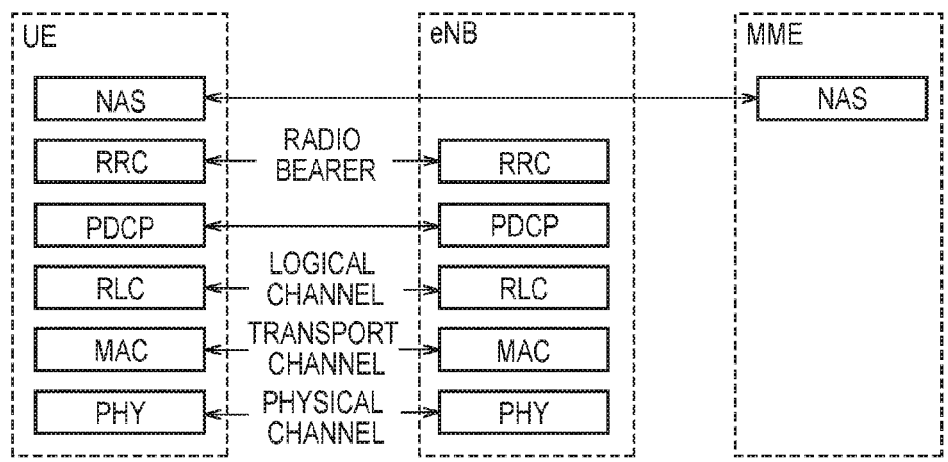
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by use of a physical channel. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state, and when the RRC connection is not established, the UE 100 is in an idle state.

A NAS (Non-Access Stratum) layer positioned above the RRC layer performs session management or mobility management, for example.

Figure 5:
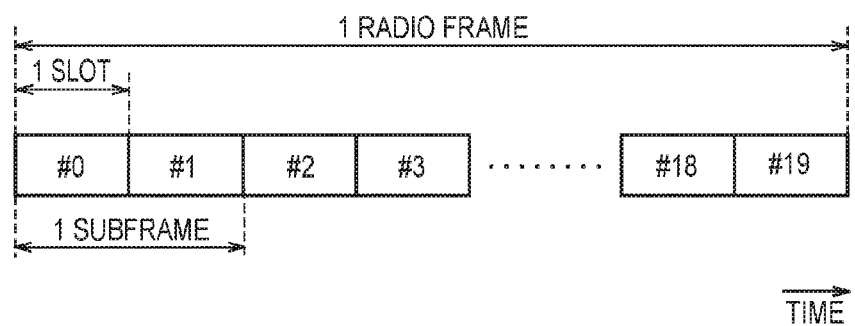
FIG. 5 is a configuration diagram of a radio frame used in an LTE system.

FIG. 5 is a configuration diagram of a radio frame used in the LTE system. In the LTE system, OFDMA (Orthogonal Frequency Division Multiple Access) is used in a downlink, and SC-FDMA (Single Carrier Frequency Division Multiple Access) is used in an uplink.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, cell-specific reference signals (CRSs) are distributed and arranged in each subframe.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH). Furthermore, demodulation reference signal (DMRS) and sounding reference signal are arranged in each subframe.

(D2D Communication)

Next, a description is given with comparing the D2D communication with the normal communication (the cellular communication) in the LTE system.

Figure 6:
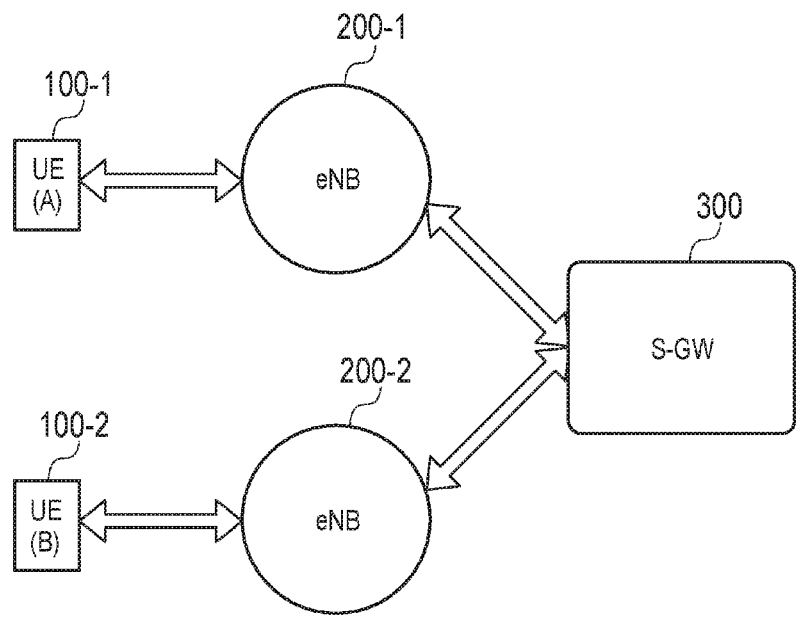
FIG. 6 is a diagram showing a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication goes through a network. Specifically, the data path is set to pass through the eNB 200-1, the S-GW 300, and the eNB 200-2.

Figure 7:
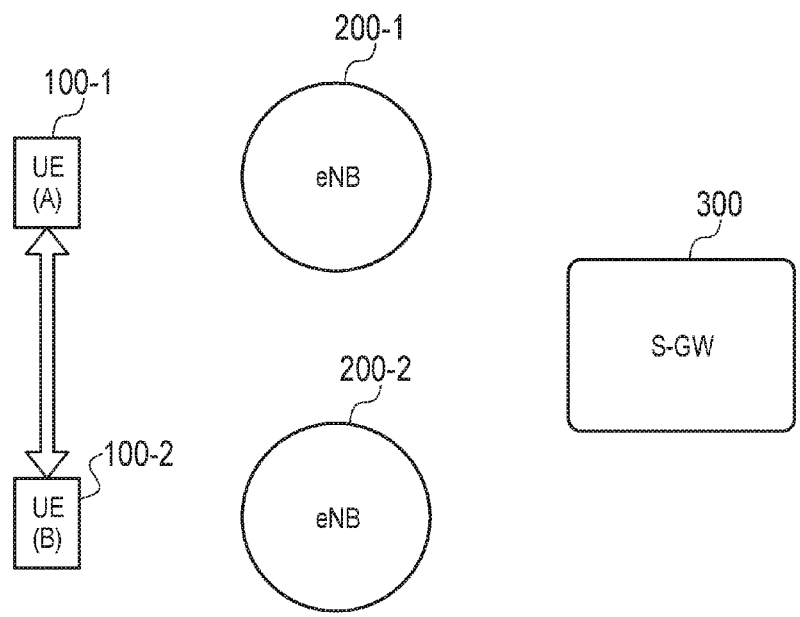
FIG. 7 is a diagram showing a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not go through a network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the proximity of the one UE 100, so that the D2D communication is started.

In such a case, in order to discover the proximal terminal, the UE 100 has a (Discover) function of discovering another UE 100 existing in the proximity of the UE 100, and/or a (Discoverable) function of being discovered by another UE 100.

Specifically, the UE 100-1 transmits a discovery signal (Discover signal/Discoverable signal) for discovering the partner terminal or for being discovered by the partner terminal. The UE 100-2 having received the discovery signal discovers the UE 100-1. The UE 100-2 transmits a response to a discovery signal so that the UE 100-1 having transmitted discovery signal discovers the UE 100-1 being the partner terminal.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Further, the UE 100-1 may report a vicinity UE 100 (that is, the UE 100-2) to an upper layer (such as an application) in a case where the UE 100-1 does not perform the D2D communication after discovering the partner terminal. For example, the application can perfume a process based on the report (such as a process in which a location of the UE 100-2 is plotted on map information).

Further, the UE 100 can report discovering the partner terminal to the eNB 200 and receive instruction for whether communication with the partner terminal is performed by the cellular communication or the D2D communication, from the eNB 200.

On the other hand, in the above-described case (b), for example, the UE 100-1 starts transmitting (announcing by broadcast or the like) a signal for the D2D communication without specifying the partner terminal. Thus, the UE 100 is capable of starting the D2D communication regardless of the existence of the discovery of a partner terminal. It is noted the UE 100-2 performing a waiting operation for receiving a signal for the D2D communication performs synchronization and/or demodulation on the basis of the signal from the UE 100-1.

(NW-Type Discovery Process and UE-Type Discovery Process)

Next, an NW-type discovery process and a UE-type discovery process will be described.

The mobile communication system supports, as a process of discovering a partner terminal in D2D communication, the NW-type discovery process (network-based discovery process) and the UE-type discovery process (user terminal-based discovery process).

The NW-type discovery process and the UE-type discovery process are either one of the following discovery processes, for example.

Firstly, in the NW-type discovery process, before a discovery operation of a UE 100 is performed, the eNB 200 and a network (network device) such as the MME transmit terminal information on the UE 100 (transmission-side UE 100) that performs the discovery operation (transmission of a discovery signal), to a UE 100 (reception-side UE 100) that is a partner to be discovered. The reception-side UE 100 discovers the transmission-side UE 100, on the basis of the terminal information. For example, for the reception-side UE 100, a range to be searched for receiving the discovery signal is specified by the terminal information.

The terminal information includes at least either one of an identifier of the transmission-side UE 100 or information (a transmission band, a transmission timing, or the like) on transmission of the discovery signal.

On the other hand, in the UE-type discovery process, the network does not transmit, before the discovery operation of the UE 100 is performed, the terminal information to the reception-side UE 100. Therefore, the reception-side UE 100 is not capable of knowing what discovery operation the transmission-side UE 100 performs. For example, the range that to be searched for receiving the discovery signal is not specified, and thus, the reception-side UE 100 searches, until receiving the discovery signal, a transmission band in a range in which the discovery signal is transmitted.

Secondly, in the NW-type discovery process, the network transmits, before the discovery operation of the UE 100 is performed, terminal information on a certain reception-side UE 100 that is to be discovered, to the transmission-side UE 100. The transmission-side UE 100 transmits the discovery signal, on the basis of the terminal information.

The terminal information herein includes at least either one of an identifier of the reception-side UE 100 or information (a reception bandwidth, a reception timing, or the like) on reception of the discovery signal.

On the other hand, in the UE-type discovery process, the network does not transmit, before the discovery operation of the UE 100 is performed, the terminal information to the transmission-side UE 100. Therefore, the transmission-side UE 100 is not capable of knowing whether there is the certain reception-side UE 100.

Thirdly, in the NW-type discovery process, the network transmits, before the discovery operation of the UE 100 is performed, the terminal information to each of the transmission-side UE 100 and the reception-side UE 100. The transmission-side UE 100 transmits the discovery signal on the basis of the terminal information, and the reception-side UE 100 discovers the transmission-side UE 100 on the basis of the terminal information.

On the other hand, in the UE-type discovery process, the network does not transmit, before the discovery operation of the UE 100 is performed, the terminal information to each of the transmission-side UE 100 and the reception-side UE 100. Therefore, the transmission-side UE 100 is not capable of knowing whether there is the certain reception-side UE 100, and the reception-side UE 100 is not capable of knowing what discovery operation the transmission-side UE 100 performs.

Fourthly, in the NW-type discovery process, when the network transmits to the UE 100, before the discovery operation of the UE 100 is performed, resource information in which a time-frequency resource used for the discovery process is designated, the UE 100 that receives the resource information needs to perform the discovery operation (transmission or reception of the discovery signal) by using the resource information.

On the other hand, in the UE-type discovery process, when the network transmits, before the discovery operation of the UE 100 is performed, the resource information to the UE 100, the UE 100 that receives the resource information does not need to perform the discovery operation (transmission or reception of the discovery signal) by using the resource information. The UE 100 that receives the resource information may perform the discovery operation by using the resource information.

Fifthly, in the NW-type discovery process, before the discovery operation of the UE 100 is performed, the transmission-side UE 100 and the reception-side UE 100 know a partner that is to be discovered.

On the other hand, in the UE-type discovery process, before the discovery operation of the UE 100 is performed, the transmission-side UE 100 and the reception-side UE 100 does not know a partner that is to be discovered.

Sixthly, in the NW-type discovery process, the discovery operation is performed on the presupposition that the D2D communication is performed. For example, when the network determines to cause a group of UEs 100 during cellular communication to perform the D2D communication, the NW-type discovery process is performed.

On the other hand, in the UE-type discovery process, the discovery operation is performed irrespective of whether the D2D communication is performed.

(Operation Sequence)

Next, operation sequences 1 to 5 of the mobile communication system according to the present embodiment will be described.

In the NW-type discovery process, the network transmits, before the discovery operation of the UE 100 is performed, the terminal information to each of the transmission-side UE 100 and the reception-side UE 100, below. On the other hand, in the UE-type discovery process, the network does not transmit, before the discovery operation of the UE 100 is performed, the terminal information.

The operation sequence 1 is the NW-type discovery process, and the operation sequences 2 to 5 are the UE-type discovery process. It is possible to commonly utilize, for control in the NW-type discovery process and control in the UE-type discovery process, identification information used in each operation sequence.

(1) Operation Sequence 1 (NW-Type Discovery Process)

Figure 8:
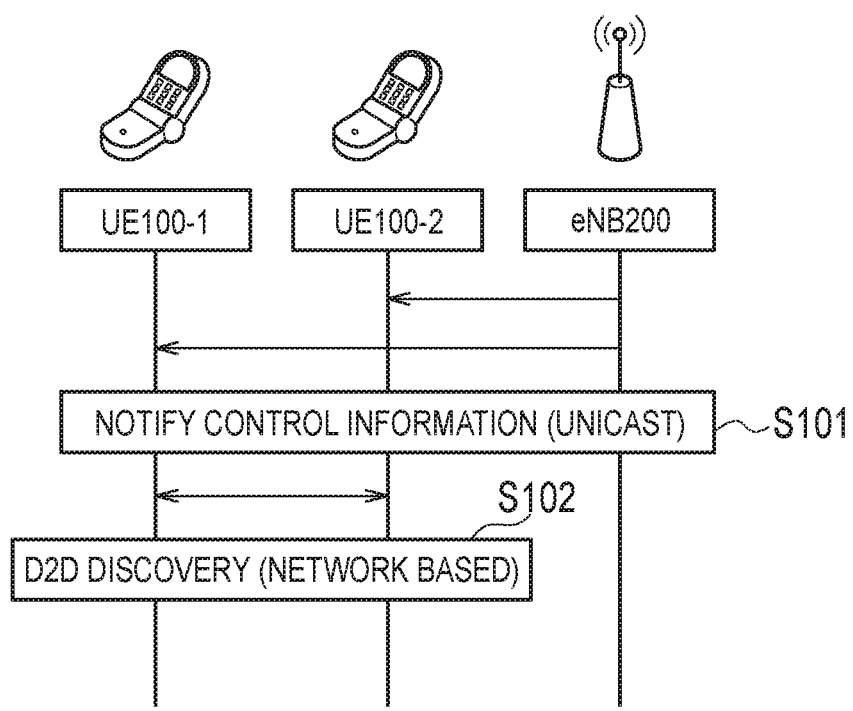
FIG. 8 is a sequence diagram describing an operation sequence 1 of a mobile communication system according to an embodiment.
Figure 9:
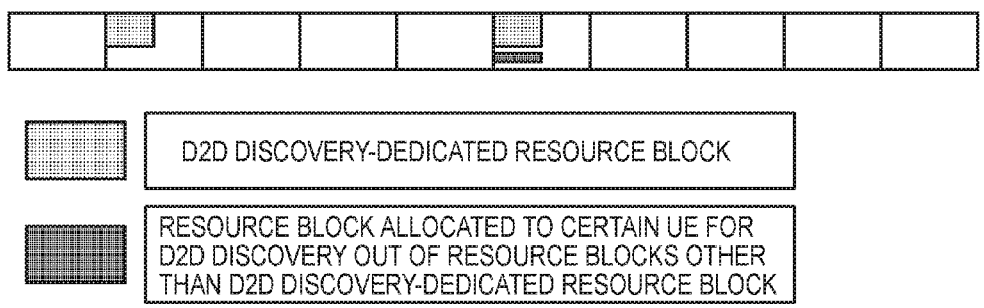
FIG. 9 is an explanatory diagram for describing a time-frequency resource in the operation sequence 1 of the mobile communication system according to the embodiment.

The operation sequence 1 will be described by using FIG. 8 and FIG. 9. FIG. 8 is a sequence diagram describing the operation sequence 1 of the mobile communication system according to the embodiment. FIG. 9 is an explanatory diagram for describing a time-frequency resource in the operation sequence 1 of the mobile communication system according to the embodiment.

The eNB 200 transmits by broadcast or by unicast information indicating a radio resource region (hereinafter, referred to as "UE-type radio resource region", where appropriate) in which it is possible to perform the UE-type discovery process (not shown). The UE 100 is capable of performing the UE-type discovery process by using a time-frequency resource within the radio resource region. The information indicating the radio resource region is a dedicated resource block for the discovery process (D2D discovery), as shown in FIG. 9, for example.

As shown in FIG. 8, in step S101, the eNB 200 notifies (transmits), to each of the UE 100-1 and the UE 100-2 that exist in its own cell, by unicast, control information (that is, the above-described terminal information) for causing the NW-type discovery process to be performed. Each of the UE 100-1 and the UE 100-2 receives the control information.

In the present embodiment, the control information includes identification information that is information assigned to the UE 100-1 and the UE 100-2 that is to be a partner of the UE 100-1 in the D2D communication.

Before transmitting the control information, the eNB 200 previously assigns, to the UE 100-1 and the UE 100-2, the identification information for identifying the respective partners. The identification information assigned by the eNB 200 includes the following information (a) and (b), for example.

(a) Signal Sequence of Discovery Signal

The eNB 200 selects one signal sequence from among a plurality of signal sequences (orthogonal sequence) used for transmission (and reception) of the discovery signal, and retains the selected signal sequence as a signal sequence common and dedicated to the UE 100-1 and the UE 100-2. The eNB 200 transmits, as the identification information, an identifier indicating the retained signal sequence of the discovery signal, and allocates the retained signal sequence commonly to the UE 100-1 and the UE 100-2.

(b) Time-Frequency Resource

The eNB 200 retains the time-frequency resource within the UE-type radio resource region, for the UE 100-1 and the UE 100-2. The eNB 200 transmits, as the identification information, an identifier indicating the retained time-frequency resource, and allocates the retained time-frequency resource commonly to the UE 100-1 and the UE 100-2.

Further, the control information may include, in addition to the identification information, transmission and reception information for specifying the UE 100 that transmits the discovery signal and/or the UE 100 that receives the discovery signal.

In step S102, the UE 100-1 and the UE 100-2 that receive the control information use the time-frequency resource within the UE-type radio resource region to perform the NW-type discovery process. Specifically, the UEs 100 (the UE 100-1 and the UE 100-2) use the time-frequency resource within the UE-type radio resource region, and transmit or receive the discovery signal on the basis of the control information to perform the discovery process. As a result, it is possible to perform the NW-type discovery process by using the UE-type radio resource region, and thus, the control of (specifically, for causing the discovery process to be performed) the discovery process is made common, resulting in an effective utilization of the radio resource.

For example, when the identification information indicating the signal sequence of the discovery signal is included in the control information, the UE 100-1 is capable of transmitting the discovery signal by using the signal sequence based on the identification information. When the signal sequence of the received discovery signal and the signal sequence indicated by the identification information received from the eNB 200 match, the UE 100-2 that receives the discovery signal is capable of identifying that a transmission source of the received discovery signal is the UE 100-1. As a result, the UE 100-2 is capable of discovering the UE 100-1. On the other hand, when receiving a response to the discovery signal from the UE 100-2, the UE 100-1 is capable of identifying and discovering the UE 100-2. The UE 100-2 may use the signal sequence indicated by the identification information to transmit the response to the discovery signal.

Further, when the identification information indicating the time-frequency resource within the UE-type radio resource region is included in the control information, the UE 100-1 is capable of transmitting the discovery signal by using the time-frequency resource based on the identification information. When the time-frequency resource used for transmission of the received discovery signal and the time-frequency resource indicated by the identification information received from the eNB 200 match, the UE 100-2 that receives the discovery signal is capable of identifying that a transmission source of the received discovery signal is the UE 100-1. As a result, the UE 100-2 is capable of discovering the UE 100-1.

Further, as shown in FIG. 9, the eNB 200 may exclusively retain the time-frequency resource outside the UE-type radio resource region, and allocate the retained time-frequency resource commonly to the UE 100-1 and the UE 100-2. It is noted that the radio resource region outside the UE-type radio resource region (hereinafter, referred to as "NW-type radio resource region, where appropriate) may be a radio resource region used for cellular communication (cellular communication dedicated region), or a radio resource region used for D2D communication (region common to the cellular communication and the D2D communication).

When the identification information indicating a first time-frequency resource that is the time-frequency resource within the NW-type radio resource region is included in the control information, the UE 100-1 is capable of transmitting the discovery signal by simultaneously using the first time-frequency resource and a second time-frequency resource that is located in an identical time zone and is the time-frequency resource within the UE-type radio resource region. The UE 100-2 simultaneously uses the first time-frequency resource and the second time-frequency resource to receive the discovery signal. This enables transmission of the discovery signal in a multiplexing manner, and obtaining of a diversity effect. As a result, even when a large number of UEs 100 transmit the discovery signal, it is possible to improve a discovery success probability.

It is noted that the second time-frequency resource may be indicated by the identification information and may be appropriately selected, from within the UE-type radio resource region, by the UE 100-1 that transmits the discovery signal.

Further, when the transmission and reception information is included in the control information, the UE 100-1 and the UE 100-2 are capable of performing the discovery operation (transmission or reception of the discovery signal) indicated by the transmission and reception information. This prevents a case where both the UE 100-1 and the UE 100-2 transmit or receive the discovery signal and are both not capable of receiving the discovery signal, and thus, it is possible to efficiently discover the partner terminal.

Thereafter, by the discovery process, each of the UE 100-1 and the UE 100-2 discovers the partner terminal, and then, each establishes a connection for performing D2D communication and performs the D2D communication.

It is noted that after discovering the partner terminal, at least one of the UE 100-1 and the UE 100-2 may transmit a discovery report indicating that the partner terminal is discovered, to a network such as the eNB 200. The network that receives the discovery report may or may not cause the UE 100-1 and the UE 100-2 to perform the D2D communication.

For example, when determining that the interference is applied to another UE 100 that performs the cellular communication or the D2D communication by causing the UE 100-1 and the UE 100-2 to perform the D2D communication, the network may determine to not cause the UE 100-1 and the UE 100-2 to perform the D2D communication. In this case, when each of the UE 100-1 and the UE 100-2 has another proximal radio communication capability (Wifi direct, for example), the network may instruct causing the other proximal radio communication to be performed, to each of the UE 100-1 and the UE 100-2. It is noted that the network may request, after determining to not cause the D2D communication to be performed, the capability information indicating whether or not the other proximal radio communication capability is provided, to each of the UE 100-1 and the UE 100-2, and each of the UE 100-1 and the UE 100-2 may previously transmit the capability information.

(2) Operation Sequence 2(UE-Type Discovery Process)

Next, an operation sequence 2 will be described using FIG. 10. FIG. 10 is a sequence diagram for describing the operation sequence 2 of the mobile communication system according to the embodiment. It is noted that description proceeds with a focus on a portion different from the above-described operation sequence 1, and a similar portion will not be described, where necessary.

In the operation sequence 1, the NW-type discovery process is performed, and in the operation sequence 2, the UE-type discovery process will be performed.

As shown in FIG. 10, in step S201, when desiring to perform the D2D communication in a state of not receiving the control information for causing the NW-type discovery process to be performed, the UE 100-2 requests the identification information to the eNB 200 in order to transmit the discovery signal. The eNB 200 receives the request for the identification information.

In response to the request for the identification information, the eNB 200 retains a resource for the UE 100-2. Specifically, the eNB 200 retains one signal sequence, among a plurality of signal sequences used for transmission of the discovery signal, for the UE 100-2. Here, the plurality of signal sequences is common to the signal sequence in the above-described operation pattern 1.

Further, the eNB 200 records, in an associated manner, the UE 100-2 and the retained resource on a corresponding list. The corresponding list is a list about a plurality of identification information and a plurality of UE information including information indicating the UEs each of which corresponds to the plurality of identification information.

In step S202, the eNB 200 transmits (notifies), by unicast, to the UE 100-2, the identification information indicating the retained resource. The UE 100-2 receives the identification information. The identification information is used for identification of the transmission source of the discovery signal.

In step S203, the UE 100-2 uses, on the basis of the identification information, the time-frequency resource within the UE-type radio resource region, and performs the UE-type discovery process (specifically, the transmission of the discovery signal). The UE 100-1 receives the discovery signal.

The UE 100-1 is not capable of identifying the transmission source of the discovery signal, unlike in the operation sequence 1. Thus, the UE 100-1 obtains the identification information by the received discovery signal. For example, the UE 100-1 obtains, as the identification information, the signal sequence of the received discovery signal (and/or the time-frequency resource used for transmission of the received discovery signal).

In step S204, the UE 100-1 requests the UE information indicating the UE corresponding to the identification information obtained by the received discovery signal, to the eNB 200.

The eNB 200 identifies, in response to the corresponding UE information request, the UE corresponding to the identification information included in the corresponding UE information request, on the basis of the corresponding list. In the present embodiment, the eNB 200 identifies, in response to the corresponding UE, as the UE 100-2, the UE corresponding to the identification information.

In step S205, the eNB 200 transmits (notifies), as the UE information, information (the identifier, for example) indicating the UE 100-2, to the UE 100-1. The UE 100-1 receives the UE information. The UE 100-1 identifies the UE 100-2, on the basis of the received UE information.

Thus, in the operation sequence 2, the UE 100-1 is capable of identifying the UE 100-2, on the basis of the identification information obtained by the discovery signal. Specifically, the UE 100-1 requests the UE information indicating the UE corresponding to the identification information obtained by the discovery signal, to the eNB 200, and receives the UE information from the eNB 200. As a result, the UE 100-1 is capable of identifying the UE 100-2.

Further, the UE 100-1 transmits, to the UE 100-2, a discovery signal response including information for identifying the UE 100-1. As a result, the UE 100-2 is capable of identifying the UE 100-1. Thereafter, the UE 100-1 and the UE 100-2 establish a connection through which the D2D communication is performed to perform the D2D communication.

(3) Operation Sequence 3 (UE-Type Discovery Process)

Next, an operation sequence 3 will be described using FIG. 11. FIG. 11 is a sequence diagram for describing the operation sequence 3 of the mobile communication system according to the embodiment. It is noted that description proceeds with a focus on a portion different from the above-described operation sequences 1 and 2, and a similar portion will not be described, where necessary.

In the operation sequence 2, the UE 100-1 identifies the UE 100-2 on the basis of the request of the UE information indicating the UE corresponding to the identification information obtained by the discovery signal being made to the eNB 200. In the operation sequence 3, the UE 100-1 identifies the UE 100-2, on the basis of the identification information obtained by the discovery signal being transmitted to the transmission source of the discovery signal.

Steps S301 to S303 correspond to steps S201 to S203.

In step S304, the UE 100-1 notifies the transmission source (UE 100-2) of the discovery signal of a response to the discovery signal. The UE 100-2 receives the response to the discovery signal.

In step S305, the UE 100-1 requests the UE information for identifying a partner UE including the identification information. The UE 100-2 transmits (notifies) the information indicating the UE 100-2, to the UE 100-1 from which the identification information is transmitted. The UE 100-1 is capable of identifying the UE 100-2, on the basis of the information indicating the UE 100-2.

On the other hand, the UE 100-2 similarly requests the UE information for identifying the partner UE, to the UE 100-1 from which the response to the discovery signal is transmitted. The UE 100-1 transmits, in response to a UE information request, the information indicating the UE 100-2, to the UE 100-2. The UE 100-2 is capable of identifying the UE 100-1, on the basis of the information indicating the UE 100-1.

It is noted that the UE 100-1 may transmit the identification information, into the response to the discovery signal, to the transmission source (UE 100-2) of the discovery signal.

Thus, in the operation sequence 3, the UE 100-1 is capable of identifying the UE 100-2, by a request of UE information between UEs.

(4) Operation Sequence 4 (UE-Type Discovery Process)

Next, an operation sequence 4 will be described using FIG. 12. FIG. 12 is a sequence diagram for describing the operation sequence 4 of the mobile communication system according to the embodiment. It is noted that description proceeds with a focus on a portion different from the above-described operation sequences 1 to 3, and a similar portion will not be described, where necessary.

In the operation sequence 4, the UE 100-1 identifies the UE 100-2, on the basis of the identification information obtained by the discovery signal and the corresponding list received from the eNB 200.

Steps S401 and S402 correspond to steps S201 and S202.

In step S403, the eNB 200 transmits the corresponding list (see the operation sequence 2) in which the UE 100-1 and the retained resource are made to correspond, to the UE 100-1. The eNB 200 may transmit, by unicast, the corresponding list on the basis of a request from the UE 100-1, and may transmit the same by broadcast. The UE 100-1 receives the corresponding list.

Step S404 corresponds to step S203.

The UE 100-1 identifies the UE 100-2, on the basis of the identification information obtained by the discovery signal in step S404 and the corresponding list in step S403. Specifically, the UE 100-1 compares the identification information obtained by the discovery signal with the corresponding list to search the UE information made to correspond to the identification information obtained by the discovery signal. The UE 100-1 is capable of identifying the UE 100-2 by the searched UE information.

Thus, in the operation sequence 4, the UE 100-1 is capable of identifying the UE 100-2, on the basis of the identification information obtained by the discovery signal and the corresponding list.

(5) Operation Sequence 5 (UE-Type Discovery Process)

Next, an operation sequence 5 will be described using FIG. 13. FIG. 13 is a sequence diagram for describing the operation sequence 5 of the mobile communication system according to the embodiment. It is noted that description proceeds with a focus on a portion different from the above-described operation sequences 1 to 4, and a similar portion will not be described, where necessary.

In the operation sequence 2, when desiring to perform the D2D communication, the UE 100-2 requests the identification information to the eNB 200, in order to transmit the discovery signal. On the other hand, in the operation sequence 5, the eNB 200 broadcasts the identification information, without the request from the UE 100.

In step S501, the eNB 200 broadcasts the identification information. Here, the identification information is a plurality of identifiers, and is a plurality of signal sequences used for transmission of the discovery signal or a plurality of time-frequency resources, for example.

In step S502, the UE 100-2 selects a predetermined identifier from among the plurality of identifiers. The UE 100-2 uses the selected identifier to transmit the discovery signal.

It is noted that the identifier used by the UE 100-2 for transmission of the discovery signal may be probably used by another UE 100 for transmission of the discovery signal, and thus, it is preferable to transmit the discovery signal including the identifier of the UE 100-2.

Steps S503 and S504 correspond to steps S304 and S305 except that a predetermined identifier is used instead of the identification information.

It is noted that when the UE 100-2 receives, from the UE 100-1, a response including the identifier of the UE 100 different from the identifier of the UE 100-2, the UE 100-2 determines that the discovery is failed, and retransmits (S502) the discovery signal.

Thus, in the operation sequence 5, the UE 100-2 selects a predetermined identifier from among the plurality of identifiers, and uses the selected identifier to transmit the discovery signal. On the other hand, the UE 100-1 is capable of identifying the UE 100-2, on the basis of the identifier obtained by the discovery signal.

It is noted that in view of an effective utilization and implementation of a resource, the UE-type discovery process and the NW-type discovery process are desirably made as common as possible in terms of control of the discovery process (including control for causing the discovery process to be performed). According to the above-described embodiment, it is possible to perform the NW-type discovery process by using the time-frequency resource within the radio resource region where it is possible to perform the UE-type discovery process. Further, identification information may be commonly utilized both in control in the NW-type discovery process and in control in the UE-type discovery process. Therefore, between the UE-type discovery process and the NW-type discovery process, the control of the discovery process is common, and thus, in view of an effective utilization and implementation of a resource, it is effective.

Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, the D2D communication between the UE 100-1 and the UE 100-2 is assumed; however, this is not limiting. When the partner terminal that is to be a partner of the UE 100-1 in the D2D communication is a plurality of UEs 100 (the UE 100-2 and a UE 100-3, for example), the eNB 200 may retain a signal sequence of the discovery signal and a resource, such as a time-frequency resource, used for the discovery process, commonly to and exclusively for (a D2D group including) the UE 100-1, the UE 100-2, and the UE 100-3. The eNB 200 transmits the identification information indicating the retained resource, to each of the plurality of UEs 100 (the UE 100-1, the UE 100-2, and the UE 100-3) configuring the D2D group, and the plurality of UEs 100 are capable of discovering the partner terminal on the basis of the identification information.

Further, in the above-described embodiment, in the operation sequence 5, the identifier of the UE 100 is used to determine whether the discovery is successful or not; however, even in other operation sequences, the identifier of the UE 100 may be used to determine whether the discovery is successful or not.

Further, in the above-described embodiment, the operation sequences 1 to 5 may be combined and executed, where necessary.

In the above-described embodiment, an example in which the present invention is applied to the LTE system has been described; however, the present invention may also be applied to systems, other than the LTE system, as well as the LTE system.

The invention claimed is:

1. A communication method to be used in a communication system capable of performing a discovery procedure in which a first user terminal directly transmits discovery signal to a second user terminal and/or directly receives discovery signal from the second user terminal, the communication method comprising:
   transmitting, from the first user terminal to a network apparatus, a first request;
   transmitting, from the second user terminal to the network apparatus, a second request;
   transmitting, from the network apparatus to the first user terminal, a first identifier used for the discovery procedure, in response to the first request;
   transmitting, from the network apparatus to the second user terminal, a first information including a second identifier used for the discovery procedure;
   transmitting, from the first user terminal to the second user terminal, the discovery signal with using the first identifier;
   receiving, by the second user terminal, the discovery signal from the first user terminal;
   obtaining, by the second user terminal, the first identifier on a basis of the received discovery signal;
   determining, by the second user terminal, whether the obtained first identifier matches the second identifier;
   transmitting, from the second user terminal to the network apparatus, a report based on receiving the discovery signal, in response to matching between the obtained first identifier and the second identifier, wherein the report includes the obtained first identifier;
   receiving, by the base station, the report from the second user terminal; and
   transmitting, from the base station to the second user terminal, identification information corresponding to the obtained first identifier, in response to receiving the report.

2. A second user terminal, comprising
   a controller and a memory communicatively coupled to the controller configured to perform a discovery procedure in which the second user terminal directly transmits discovery signal to a first user terminal and/or directly receives discovery signal from the first user terminal;

a transmitter configured to transmit a second request to a network apparatus;

a receiver configured to receive first information from the network apparatus in response to the second request, the first information including a second identifier used for the discovery procedure;

the controller is configured to:
receive the discovery signal with using a first identifier, from the first user terminal, wherein the first identifier is assigned to the first user terminal by the network apparatus in response to a first request from the first user terminal;
obtain the first identifier on a basis of the received discovery signal; and
determine whether the obtained first identifier matches the second identifier;

the transmitter is configured to transmit, to the network apparatus, a report based on receiving the discovery signal, in response to matching between the obtained first identifier and the second identifier, wherein the report includes the obtained first identifier; and the receiver is configured to receive, from the network apparatus, identification information corresponding to the obtained first identifier, in response to the network apparatus receiving the report.

3. A processor for controlling a second user terminal, comprising a memory coupled to the processor and including instructions, such that when executed by the processor, executes the processes of:

performing a discovery procedure in which the second user terminal directly transmits discovery signal to a first user terminal and/or directly receives discovery signal from the first user terminal;

transmitting a second request to a network apparatus;

receiving first information from the network apparatus in response to the second request, the first information including a second identifier used for the discovery procedure;

receiving the discovery signal with using a first identifier, from the first user terminal, wherein the first identifier is assigned to the first user terminal by the network apparatus in response to a first request from the first user terminal;

obtaining the first identifier on a basis of the received discovery signal;

determining whether the obtained first identifier matches the second identifier;

transmitting, to the network apparatus, a report based on receiving the discovery signal, in response to matching between the obtained first identifier and the second identifier, wherein the report includes the obtained first identifier; and receiving, from the network apparatus, identification information corresponding to the obtained first identifier, in response to the network apparatus receiving the report.

* * * * *